Patented Oct. 15, 1929

1,731,483

UNITED STATES PATENT OFFICE

HARRY L. FISHER, OF LEONIA, NEW JERSEY, AND WILLIAM C. GEER, OF NEW ROCHELLE, NEW YORK, ASSIGNORS TO THE B. F. GOODRICH COMPANY, OF NEW YORK. N. Y., A CORPORATION OF NEW YORK

RUBBER COMPOSITION AND METHOD OF MAKING AND SHAPING THE SAME

No Drawing. Application filed April 14, 1924, Serial No. 706,257. Renewed January 16, 1929.

This invention relates to moldable compositions and more especially to compositions rendered heat plastic by the presence of a hard, friable thermoplastic derivative of rubber.

It heretofore has been known that sulfonic compounds containing the grouping R—$SO_2$—X, wherein R is an organic radical or a hydroxy group and X represents chlorine or a hydroxy group, such as sulfuric acid, sulfonyl chlorides, and sulfonic acids may be caused to react with rubber to produce a hard brittle substance containing no combined chlorine or sulfur, the chlorine being lost during the reaction as hydrochloric acid and the sulphur escaping in the form of sulphur dioxide, the final product being substantially free from either chlorine or sulphur, provided the mixture of rubber and reagent has been heated to produce therein a pronounced exothermic reaction.

Mixtures of rubber and such reagents may be heated in a mold to effect reaction and to produce the final reaction product as a formed article, but this process is defective due to the evolution of large quantities of gases during the reaction and to the porosity resulting therefrom. Moreover, the modifications of the properties of the final product by the addition of pigments, softeners or other ingredients before the reaction is impossible in many instances due to the reaction of these ingredients with the reagents, such as sulfuric acid or sulfonic acid or sulfonyl chloride, or with the products of the reaction, such as hydrochloric acid or sulfur dioxide.

The chief object of this invention is to provide improved, moldable compositions suitable for the preparation of such articles as phonograph records, radio dials, molded insulation, telephone receivers or battery jars. A more specific object is to provide an improved method for producing non-porous molded articles from the rubber reaction products above described. A further object is to provide pigmented compositions which may be repeatedly remolded without deterioration of their properties, whereby all scrap, trimmings or imperfect articles may be reused without loss and whereby used articles may be returned to the factory for remolding. A still further object is inexpensively to provide phonograph record compositions possessing exceptional tone qualities without the use of shellac.

The reaction products of rubber and sulfonyl chlorides or sulfonic acids as well as the reaction products of rubber with a mixture of components adapted to form a sulfonic acid, such as toluene and sulfuric acid, phenol and sulfuric acid, or pine tar and sulfuric acid, may be so prepared as to be substantially free from chlorine or sulphur combined with the rubber hydrocarbon and to produce brittle solids which we find are readily remoldable, may be ground to a fine powder, and possess a gradual softening point at temperatures ranging from 200° F. to 300° F.

By way of example of the preparation of these friable heat-plastic derivatives of rubber, masticate upon a rubber mill 100 parts by weight of rubber and gradually add thereto during mastication a mixture of 8 parts of p-toluene sulfonic acid and 2 parts sulfuric acid (sp. gr. 1.84). When thoroughly mixed, the mass is heated, its temperature being gradually raised until a vigorous exothermal reaction is set up therein. It has been found satisfactory to heat the mass in an air oven at about 140° C. for 6 to 8 hours. Alternately, for the toluene sulfonic and sulfuric acid of the above example, we may substitute p-toluene sulfonyl chloride, 12 parts; p-toluene sulfonic acid 13 parts; or other sulfonic acids and sulfonyl chlorides, or mixtures thereof or with sulfuric acid in substantially the proportions indicated.

The reaction products of the above example, when cooled to normal temperatures, are hard, friable, thermoplastic derivatives of rubber, which we find are in general inert with respect to, and are easily miscible with, pigments, fiber, colors, softening agents and the like and that the compositions so formed may be repeatedly remolded, have a low moisture absorption and are exceptionally valuable for sound record compositions. We also find that by remolding or otherwise reworking the rubber reaction product after the completion of the reaction, porosity of the final molded article may be avoided.

*Example 1.*—An example of a moldable composition of the class specified is as follows:

Shellac-like derivative of rubber, as above described—300 to 400 parts by weight.

Lubricant, softener or flowing agent such as paraffin, stearic acid, palm oil, japanese wax or candelilla wax—40 to 30 parts.

Pigments or filling agents such as iron oxide, infusorial earth, clay, gas black, lithopone or zinc oxide—a total of 200 to 600 parts.

Fiber, such as cotton flock—10 to 30 parts.

Color, such as gas black—10 to 40 parts.

*Example 2.*—For the production of sound-record compositions, we preferably employ ingredients within the following range:

Hard, friable, thermoplastic derivative of rubber—300 parts by weight.

Lubricant, softener or flowing agent, such as paraffin, stearic acid, palm oil, and the like—10 to 50 parts.

Pigments, such as oxide of iron, 100 to 300 parts.

Fillers, such as infusorial earth, 100 to 250 parts.

Fiber, such as cotton flock, 10 to 50 parts.

Color, such as gas black, 10 to 50 parts.

In either of the above Examples 1 and 2, the friable materials are preferably ground together and the powdered mixture placed on a hot rubber mill whereby it is fluxed and worked into a continuous sheet. The liquid or soft ingredients which do not grind readily are then added to the mass and thoroughly incorporated therein. The mass is then sheeted out to the thickness desired and may be stored for later use. While still hot it may be cut into disks or otherwise roughly shaped suitably for subsequent molding operations and the scrap returned to the hot mill. The partially formed articles or the uncut sheet may be then warmed on a hot plate or in an oven and hot molded to their final shape.

An alternative method of molding comprises grinding compositions of the above type either before or after fluxing on a hot mill and molding the powder in hot molds under heavy pressure.

A specific example of a high grade moldable composition suitable for phonograph records comprises the reaction product of rubber with a mixture of 8 parts by weight of para-toluene sulfonic acid and 2 parts of sulfuric acid—300 parts by weight, infusorial earth 240 parts, raw sienna—330 parts, ground quartz—50 parts, gas black—30 parts, cotton flock—20 parts and carnauba wax—30 parts.

These ingredients are ground together and fluxed to a continuous sheet from which blank disks are cut. The blank disks are rewarmed on a hot plate and molded in a hot record press in the usual manner, the matrices being cooled prior to removal of the completed record. Sound records prepared from this type of composition are found to possess exceptional tone qualities, substantially superior to records formed of shellac compositions.

An example of a lower grade composition suitable for battery jar covers or the like comprises 160 parts by weight of a friable thermoplastic derivative of rubber, 160 parts of mineral rubber, 200 parts of asbestine or whiting, 150 parts of clay, ground slate or silica, 60 parts of cotton flock or fiber, 210 parts of asbestos, 30 parts of gas black and 30 parts of a suitable wax or other flux. Such compositions possess the advantage of low material cost while still retaining the properties of rapid molding, remolding and physical strength.

The term sulfonic acid as used herein and as included in the generic formula is intended to include only free sulfonic acids and to exclude so-called sulfonic acids whose acidity is internally or otherwise compensated by the presence of basic or salt-forming groups.

We do not wholly limit ourselves to any definite method of preparing these rubber derivatives nor to specific proportions of reagents or ingredients except as set forth in the following claims.

The present invention is an improvement upon those of the copending applications of Harry L. Fisher, Serial No. 616,178, filed January 31, 1923, Serial No. 686,202, filed January 14, 1924, and Serial No. 686,899, filed January 17, 1924.

We claim:

1. A moldable composition of matter comprising an intimate mixture of a pigment and a hard, friable, thermo-plastic reaction product of rubber with a reagent having the general formula $R-SO_2-X$, wherein R represents an organic radical or a hydroxy group and X represents chlorine or a hydroxy group.

2. A moldable composition of matter comprising an intimate mixture of a pigment, a softening agent, and a hard, friable, thermoplastic reaction product of rubber with a reagent having the general formula $R-SO_2-X$, wherein R represents an organic radical or a hydroxy group and X represents chlorine or a hydroxy group.

3. A moldable composition of matter comprising an intimate mixture of filling materials, softening agents, fibrous material, and a hard, friable, thermo-plastic reaction product of rubber with a reagent having the general formula $R-SO_2-X$, wherein R represent an organic radical or a hydroxy group and X represents chlorine or a hydroxy group.

4. A moldable composition of matter comprising an intimate mixture of filling material and a hard, friable thermo-plastic reaction product of rubber with a sulfonic acid.

5. A moldable composition of matter comprising an intimate mixture of filling material, a softening agent, and a hard, friable, thermo-plastic reaction product of rubber with a sulfonic acid.

6. A moldable composition of matter comprising an intimate mixture of filling material, fibrous material, a softening agent, and a hard, friable, thermo-plastic reaction product of rubber with a sulfonic acid.

7. A moldable composition of matter comprising an intimate mixture of filling material, a hard, friable, thermo-plastic reaction product of rubber with a mixture of sulfuric acid and a sulfonic acid.

8. A moldable composition of matter comprising an intimate mixture of filling material, a softening agent, and a hard, friable, thermo-plastic reaction product of rubber with a mixture of sulfuric acid and a sulfonic acid.

9. A moldable composition of matter comprising an intimate mixture of filling material, fibrous material, a softening agent, and a hard, friable, thermo-plastic reaction product of rubber with a mixture of sulfuric acid and a sulfonic acid.

10. A moldable composition of matter comprising at least 1 part by weight of filling material with 1 part by weight of a hard, friable, thermo-plastic reaction product of rubber with a reagent having the general formula $R-SO_2-X$, wherein R represents an organic radical or a hydroxy group and X represents chlorine or a hydroxy group.

11. A moldable composition of matter comprising an intimate mixture of at least 1 part by weight of filling material with 1 part by weight of a hard, friable, thermo-plastic reaction product of rubber with a sulfonic acid.

12. A composition of matter comprising an intimate mixture of at least 1 part by weight of filling material with 1 part by weight of a hard, friable, thermo-plastic reaction product of rubber with a mixture of sulphuric acid and a sulfonic acid.

13. A sound-record composition comprising a mixture of infusorial earth, oxide of iron, gas black, cotton flock, and a hard, friable, thermo-plastic derivative of rubber.

14. A sound-record composition comprising 100 to 250 parts by weight of infusorial earth, 100 to 300 parts of oxide of iron, 10 to 50 parts of gas black, 10 to 50 parts of cotton flock, 10 to 50 parts of a softener, and 300 parts of a hard, friable, thermo-plastic derivative of rubber.

15. The method of producing a molded article which comprises effecting a reaction between rubber and a reagent having the general formula $R-SO_2-X$, wherein R represents an organic radical or a hydroxy group and X represents chlorine or a hydroxy group, permitting the reaction product to solidify by cooling, intimately mixing a filling material with the product, and molding the mixture.

16. The method of producing a molded article which comprises effecting a reaction between rubber and a reagent having the general formula $R-SO_2-X$, wherein R represents an organic radical or a hydroxy group and X represents chlorine or a hydroxy group, and reshaping the product after the completion of the reaction.

In witness whereof we have hereunto set our hands this 11th day of April, 1924.

HARRY L. FISHER.
WILLIAM C. GEER.